United States Patent [19]
Rowlette

[11] Patent Number: 5,645,959
[45] Date of Patent: Jul. 8, 1997

[54] BATTERY PLATES WITH SELF-PASSIVATING IRON CORES AND MIXED ACID ELECTROLYTE

[75] Inventor: John J. Rowlette, Monrovia, Calif.

[73] Assignee: Bipolar Power Corporation, Whittier, Calif.

[21] Appl. No.: 283,120

[22] Filed: Jul. 29, 1994

Related U.S. Application Data

[63] Continuation-in-part of Ser. No. 96,118, Jul. 22, 1993, and Ser. No. 932,521, Aug. 20, 1992, Pat. No. 5,334,464.

[51] Int. Cl.$^6$ ........................................... H01M 2/10
[52] U.S. Cl. ........................ 429/210; 429/245; 429/194; 429/188
[58] Field of Search ............................. 429/210, 245, 429/194, 188, 203, 204, 207

[56] References Cited

U.S. PATENT DOCUMENTS

| | | | |
|---|---|---|---|
| 2,564,707 | 8/1951 | Mochel . | |
| 3,728,158 | 4/1973 | Poe et al. . | |
| 3,765,942 | 10/1973 | Jache . | |
| 4,037,031 | 7/1977 | Jacob . | |
| 4,098,967 | 7/1978 | Biddick et al. . | |
| 4,208,473 | 6/1980 | Bradley . | |
| 4,275,130 | 6/1981 | Rippel et al. . | |
| 4,324,848 | 4/1982 | Will . | |
| 4,326,017 | 4/1982 | Will . | |
| 4,353,969 | 10/1982 | Rippel et al. . | |
| 4,394,613 | 7/1983 | Cole . | |
| 4,405,697 | 9/1983 | Rowlette . | |
| 4,422,917 | 12/1983 | Hayfield . | |
| 4,507,372 | 3/1985 | Rowlette . | |
| 4,510,219 | 4/1985 | Rowlette . | |
| 4,539,268 | 9/1985 | Rowlette . | |
| 4,542,082 | 9/1985 | Rowlette . | |
| 4,547,443 | 10/1985 | Rowlette et al. | 429/217 |
| 4,603,093 | 7/1986 | Edwards et al. . | |
| 4,625,395 | 12/1986 | Rowlette . | |
| 4,637,970 | 1/1987 | Yeh et al. | 429/153 |
| 4,658,499 | 4/1987 | Rowlette . | |
| 4,708,918 | 11/1987 | Fitzgerald et al. . | |
| 4,713,306 | 12/1987 | Pinsky et al. . | |
| 4,735,870 | 4/1988 | Rowlette . | |
| 4,787,125 | 11/1988 | Pinsky et al. . | |
| 4,861,689 | 8/1989 | Clough et al. . | |
| 4,900,643 | 2/1990 | Eskra et al. . | |
| 4,908,282 | 3/1990 | Badger . | |
| 4,909,955 | 3/1990 | Morris et al. . | |
| 5,002,841 | 3/1991 | Belongia et al. . | |
| 5,114,807 | 5/1992 | Rowlette . | |
| 5,348,817 | 9/1994 | Rao et al. | 429/210 |

*Primary Examiner*—M. Nuzzolillo
*Attorney, Agent, or Firm*—Fish & Richardson, P.C.

[57] ABSTRACT

The *Battery Plates with Self-Passivating Iron Cores and Mixed Acid Electrolyte* disclosed and claimed in this patent application solve the problems encountered by previous attempts to construct practical bipolar plates for lead-acid batteries. One of the preferred embodiments of the present invention comprises a novel combination of a self-repairing substrate (12) surrounded by a lead coating (16a & 16b) resulting in a bipolar plate (10A) which is nearly three times lighter than its pure lead counterpart. Since this innovative plate incorporates a core or substrate (12) that is self-passivating under the electrical potential and highly acidic conditions found in the lead-acid battery, any pinholes, gaps, or flaws in the lead coatings (16a & 16b) are naturally resealed. Another preferred embodiment utilizes a coating of a semi-conducting metal oxide (18), such as fluorine-doped stannic oxide, on the positive side of the bipolar plate (10B) instead of lead, which further reduces the weight. The self-passivation of the central core is enhanced by combining phosphoric or boric acid with the sulfuric acid electrolyte used in the battery.

15 Claims, 11 Drawing Sheets

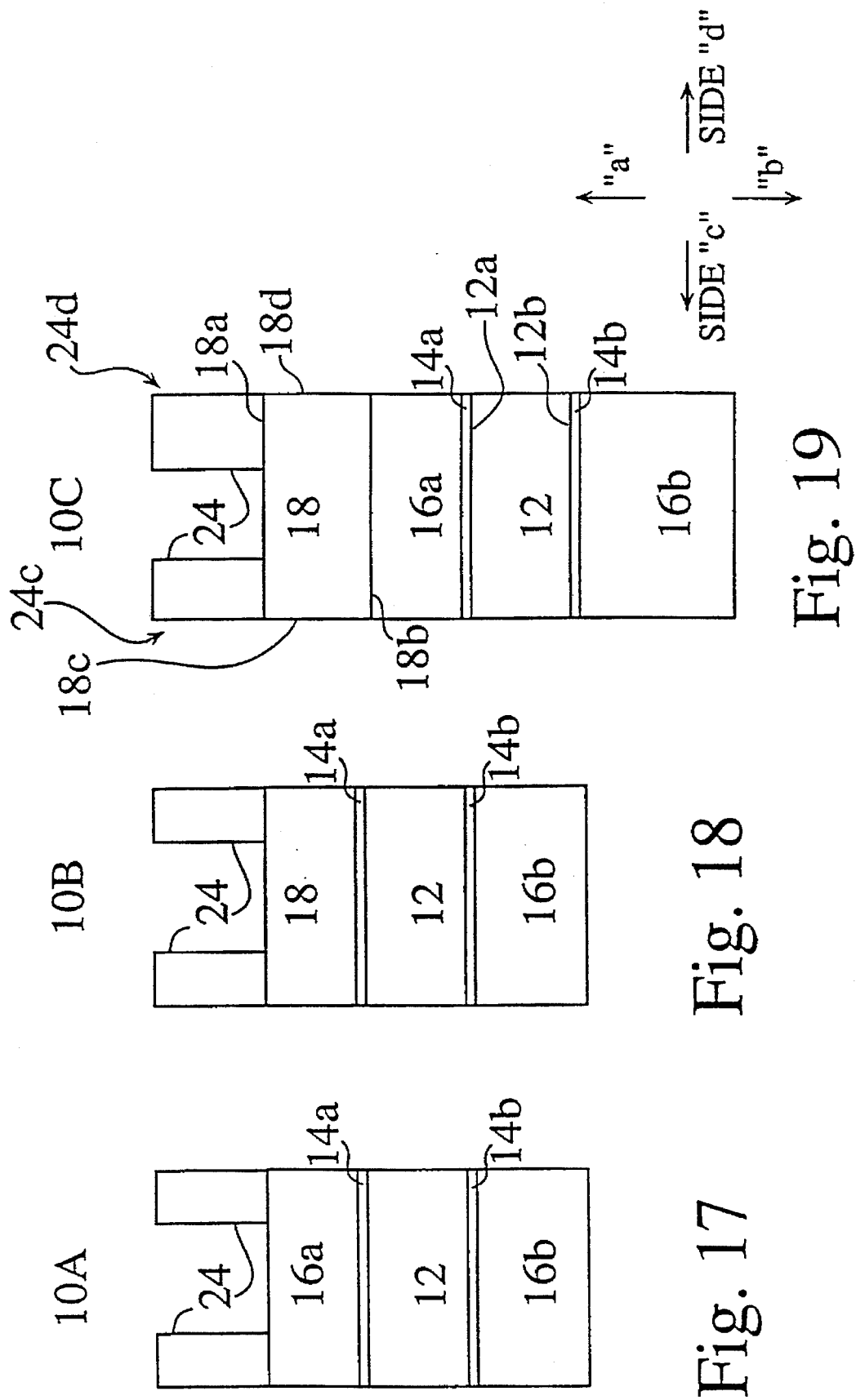

BATTERY PLATES WITH SELF-PASSIVATING IRON CORES AND MIXED ACID ELECTROLYTE

This is a continuation in part of application 08/096,118, filed Jul. 22, 1993, and of 07/932,521, filed on Aug. 20, 1992, now U.S. Pat. No. 5,334,464.

FIELD OF THE INVENTION

The present invention relates to the field of rechargeable electrical batteries, and, more specifically, to a novel plate construction for use in bipolar lead-acid batteries. The novel plate includes a central core which is self-passivating in the electrical potential and highly acidic conditions found in a lead-acid battery. The self-passivation of the central core is enhanced by combining phosphoric or boric acid with the sulfuric acid electrolyte used in the bipolar battery.

BACKGROUND OF THE INVENTION

Conventional Lead-Acid Batteries

Conventional lead-acid batteries generally comprise a series of separate (monopolar) positive and negative electrodes, connected in a combined series and parallel arrangement to achieve the desired voltage and current. Each electrode usually consists of a grid constructed of lead (Pb), or a lead alloy which is filled with and covered with an active electrode material. Lead dioxide is used as the active electrical material for the positive electrode, and sponge lead is used for the negative electrode in a fully charged battery. The purpose of the grid is twofold: to contain the active material so that the electrodes may be suspended in the sulfuric acid electrolyte solution, and to collect and to conduct the electrical current generated by the active materials, so it can be transferred to the outside of the battery. The grid is ordinarily constructed of lead metal for four reasons:

1. Lead is electrically conductive;
2. Lead is resistant to corrosion in the sulfuric-acid electrolyte solution;
3. The metal is relatively inexpensive, as compared to more resistant but unaffordable materials such as gold or platinum; and
4. Lead has exceptionally high gassing over-voltages for both hydrogen and oxygen, which minimizes the electrolytic decomposition of water in the electrolyte, and maximizes the formation efficiency of the active electrode materials, lead and lead dioxide.

The construction of conventional lead-acid batteries results in a number of problems which limit their usefulness in two important applications: electric automobiles and electric utility energy storage. The three main problems of prior lead-acid batteries are:

1. The excessive weight required to achieve high-power discharges needed by electric vehicles;
2. The excessive weight required to store appreciable energy; and
3. The batteries have insufficient life to be economical.

The excessive weight of lead-acid batteries is due to the extensive use of lead, one of the heaviest natural materials. The power of lead-acid batteries is largely limited by the use of a grid design to collect and conduct the electrical current, which forces the current to travel along a high resistance path that limits the useful power from the battery.

Conventional versus Bipolar Lead-Acid Batteries

FIG. 1 depicts a conventional lead-acid battery. An external case CS and internal partitions PAR enclose cells which contain positive (+) and negative (−) plates deployed in a spatially parallel arrangement. These plates are grids that are characterized by a pattern of indentations or open spaces which are covered with an active material. The positive plates are covered with a positive active material PAM, and the negative plates are covered with a negative active material NAM. FIG. 1 shows a pair of positive (+) and negative (−) grids in cross-section GCS bearing these active materials. Positive and negative grids are segregated within the partitions PAR by separators SEP. The spaces around the plates that come into contact with the positive and negative active materials are filled with a sulfuric acid electrolyte EL. The plates are connected to a pair of terminals T that reside on the outside of the case CS.

The 6-Volt bipolar lead-acid battery shown in FIG. 2 is fundamentally different from the conventional 6-Volt lead-acid battery portrayed in FIG. 1. A case CS having protruding terminals T encloses a group of plates that are arranged in a spatially parallel configuration, but the plates in the bipolar battery and the way they are connected are quite dissimilar from the conventional battery. Each electrode in a bipolar battery comprises a separate grid containing either the positive or negative materials, and is suspended in a battery cell. Bipolar battery construction utilizes a series of bipolar battery plates called "biplates" BP. These biplates BP are solid sheets of material that divide the battery into cells and provide electrical contact between the positive and negative electrode materials of adjacent cells. A positive grid PG and negative grid NG are compared to a biplate BP in FIGS. 3 and 4.

The stack of biplates BP shown in FIG. 2 is held together by endplates EP. The positive side of each biplate BP is covered by a positive active material PAM, while the negative side of each biplate is covered by a negative active material NAM. The spaces between the biplates BP contain separators SEP and electrolyte EL. The areas ESA around the lateral surfaces of each biplate BP may be fitted with some type of edge seal. In the bipolar battery, the electrical current needs to pass only through the thin bipolar plates BP, which also serve as the physical partitions between the cells. The electric current can, therefore, pass through the entire battery in a direction perpendicular to the plane of each biplate BP. This arrangement presents a very large cross sectional area and very short distance for the current to pass between cells, compared to the small electrical cross section of the grid and long electrical path to the next cell which is encountered in ordinary batteries. As a consequence of these large geometrical differences between the electrical paths in conventional versus bipolar batteries, the electrical resistance in the bipolar battery is approximately one fifth of conventional batteries. With this reduction in internal resistance, a high power battery suitable for electrical automobile propulsion becomes possible, provided the battery does not have excessive weight, can be constructed at an affordable cost, and also has a sufficiently long life.

The life of previous conventional and bipolar lead-acid batteries is limited by a number of failure modes. The two most common of these are the microscopic morphological degradation of the positive active material ($PbO_2$) and the corrosion of the lead material used to construct the positive grids. The effects of microscopic morphological degradation have been largely overcome by the use of electrically conductive glass fibers that are coated with doped stannic oxide and placed within the active material, as described in my U.S. Pat. No. 4,507,372. The corrosion of lead, however, cannot be completely overcome because of its intrinsic thermodynamic instability at the electrical potential, i.e., approximately 1.75 volts relative to hydrogen ($H_2/H^+$) found at the positive electrode in lead-acid batteries. This results in the slow corrosion of the lead and the formation of lead dioxide, which is mechanically weak. Eventually, sufficient corrosion of the lead grids in the positive electrode occurs and the battery performance degrades to a useless level. In contrast, the negative electrode grid suffers from no such corrosion because lead is thermodynamically stable at the negative electrode potential, 0.36 volts below the hydrogen electrode ($H_2/H+$). The negative lead grid, therefore, has an indefinite life. The foregoing discussion, although referring to the lead grids used in today's monopolar batteries, is relevant to the present invention because the same operating environments are present, i.e., sulfuric acid electrolyte and two different electrical potentials.

Unlike grids, however, the bipolar plate must simultaneously withstand a pair of positive and negative electrochemical reactions, oxidation and reduction. As a consequence, the first plates used to construct bipolar lead-acid batteries were made of solid lead, like their grid counterparts in conventional batteries. These bipolar plates were impractical for most applications, however, because of their heavy weight and the relentless corrosion. Eventually this corrosion results in a perforation of the biplate. The perforation causes an immediate electrical short between the cells, destroying cell integrity and degrading the battery. Several attempts to construct a practical plate for bipolar batteries are illustrated in FIGS. 5, 6, 7, 8, 9 and 10. One of the greatest challenges confronting developers of the bipolar lead-acid battery has been the construction of a bipolar plate which is light-weight, but which does not achieve the reduced weight by adding more cost or by compromising power capacity or useful lifetime. Each of the six different types of previous biplates, shown in FIGS. 5 through 10, are beset by their own particular shortcomings. The first lead battery plates, pictured in FIG. 5, were soft and difficult to work with. Repeated charging and discharging first creates corrosion on the plate surface. This corrosion creates areas of high electrical resistance. Eventually, the plate becomes perforated and the battery fails. Several years ago, a carbon-in-plastic plate C/P, like the one shown in FIG. 6, was developed. This hybrid plate fails quickly because the carbon oxidizes and forms acetic acid and carbon dioxide. The carbon-in-plastic plate was improved by incorporating solid lead spheres in the plastic plate, as shown in FIG. 7. This invention is described in my U.S. Pat. No. 4,658,499. Later, the carbon-in-plastic plate was improved somewhat further by adding a second layer of plastic containing the same conductive glass fibers as used in the positive electrode material. This improvement is described in my U.S. Pat. No. 4,507,372. The resulting combination plate is depicted in FIG. 8. A more complex design, which is portrayed in FIG. 9, adds a third layer of pure lead to the double plastic plate. Yet another attempt at providing a biplate for a high-power, bipolar battery is revealed by FIG. 10. This apparatus, called a "quasi-bipolar plate", includes a wrapping of lead that envelopes a plastic center, in which conduction is not through the plate as with a true biplate, but occurs around the folded edge. Although lighter in weight than pure lead, none of these hybrid or composite biplates has proven to be as good an electrical conductor or as corrosion-resistant and reliable, or as inexpensive, as the original lead plate.

Two previous bipolar battery designs are revealed in FIGS. 11 and 12. FIG. 11 is an illustration of a *Sealed Bipolar Multi-Cell Battery*, which is described in my U.S. Pat. No. 4,539,268. This low maintenance battery LMB has a pair of terminals T and a resealable vent V protruding from a housing H. The housing H encloses positive and negative plates PP and NP that are separated by fiberglass mats M. FIG. 12 provides an illustration of the stack configuration of the *Lightweight Bipolar Storage Battery*, which is described in my U.S. patent application Ser. No. 07/516,439 filed on Apr. 30, 1990. The exploded view in FIG. 12 shows a bipolar plate battery B which includes a top cover TC that protects an end plate EP, a current collector plate CC, and a current removing element CR. The enclosure E at the bottom of the assembly includes two leads L protruding from it and is designed to hold a similar group of elements that includes another end plate EP, current collector plate CC, and current removing element CR. All of these elements surround a central stack S of bipolar plates.

Despite all of these proposed solutions, the central goal of providing a biplate so that a powerful, lightweight, and practical bipolar lead-acid battery can be manufactured has remained elusive. The previous biplates are either expensive to manufacture, are extremely heavy, or are susceptible to debilitating corrosion because the plates oxidize rapidly under the severe acidic and electrical environments within the battery. The practical bipolar plate must possess a combination of critical characteristics: sufficient electrical conductivity, resistance to the different corrosion mechanisms occurring simultaneously on both the positive and negative sides of the plate, low weight, and low cost. The problem of developing a biplate with these characteristics for the bipolar lead-acid battery has presented the major obstacle to its successful development and commercialization. The achievement of a light yet powerful lead-acid storage battery that would be suitable for applications such as electric automobiles would constitute a major technological advance useful in both the automotive industry and the electrical power storage business. The enhanced performance that could be achieved using such an innovative device would satisfy a long felt need within the power and transportation industries.

SUMMARY OF THE INVENTION

The *Battery Plates with Self-Passivating Iron Cores and Mixed Acid Electrolyte* disclosed and claimed below solve the problems encountered by previous attempts to construct practical bipolar plates for lead-acid batteries. One of the preferred embodiments of the present invention comprises a novel combination of a self-repairing iron substrate surrounded by a lead coating resulting in a bipolar plate which is nearly three times lighter than its pure lead counterpart. Since this innovative plate incorporates a core or substrate that is self-passivating under the electrical potential and highly acidic conditions found in the lead-acid battery, any pinholes, gaps, or flaws in the lead coating are naturally resealed. The passivating effect is enhanced by adding phosphoric or boric acid to the sulfuric acid that is used as an electrolyte in the battery.

One of the preferred embodiments of the invention comprises a thin substrate layer of iron which bears a flash coating of nickel on both of its sides. The nickel coating serves as a wetting agent which allows layers of lead to be deposited on both sides of the substrate. One of the lead layers is bounded by a protective film of a semiconductor material such as stannic oxide.

The present invention may be used to construct an extremely lightweight and highly powerful secondary storage battery that does not suffer from the problems that plague conventional lead-acid batteries. This invention not only surmounts the manufacturing impediments and corrosion difficulties explained above in the background section, but also provides an entirely new class of mobile power supplies that will revolutionize the transportation industry. This innovative method and apparatus provide an enormously efficient storage battery that will enable auto and truck manufacturers to produce the first truly practical electric vehicles. The present invention will also supply electric utilities with an extremely efficient load leveling battery that will benefit consumers around the world.

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

Figure 1:
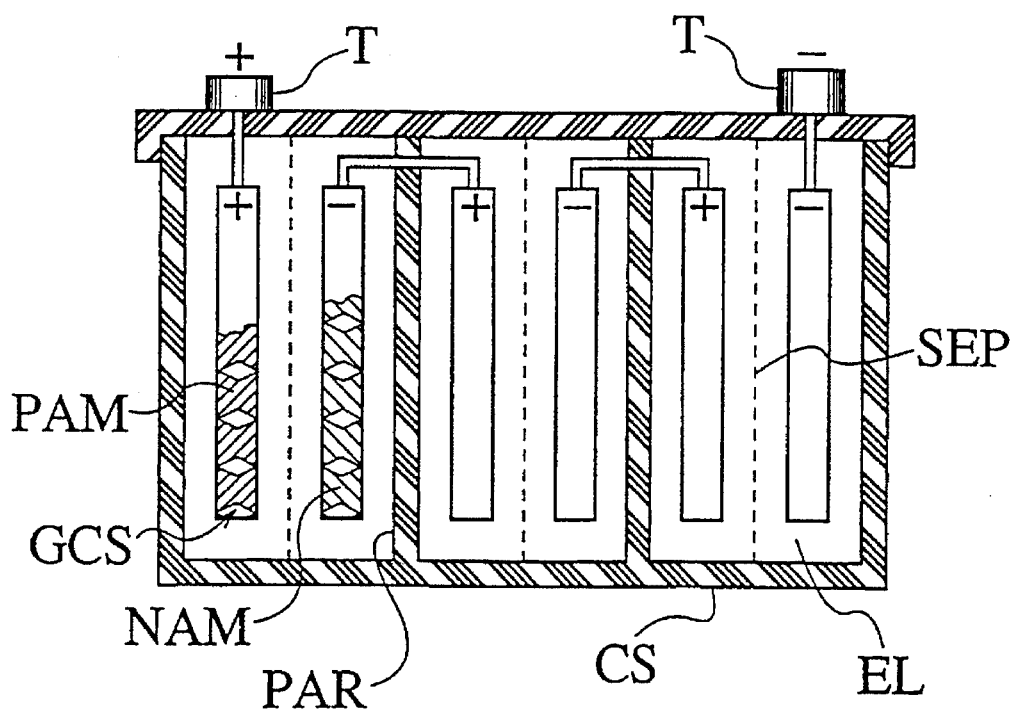
FIG. 1 is a schematic cross-sectional view of a conventional lead-acid battery.
Figure 2:
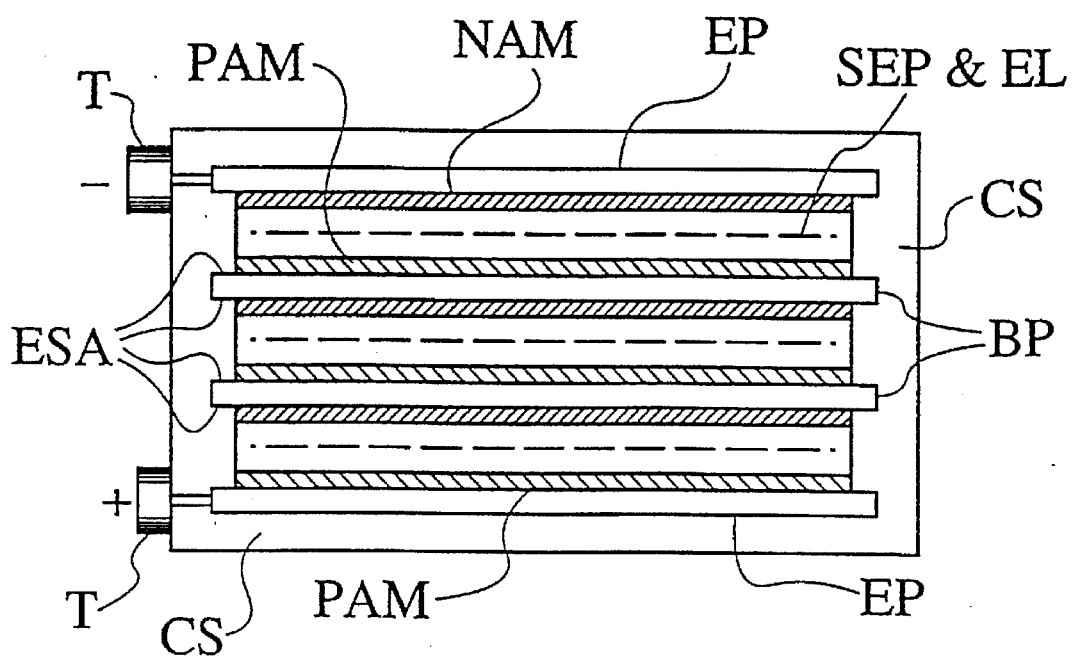
FIG. 2 is a schematic cross-sectional view of a bipolar lead-acid battery.
Figure 3:
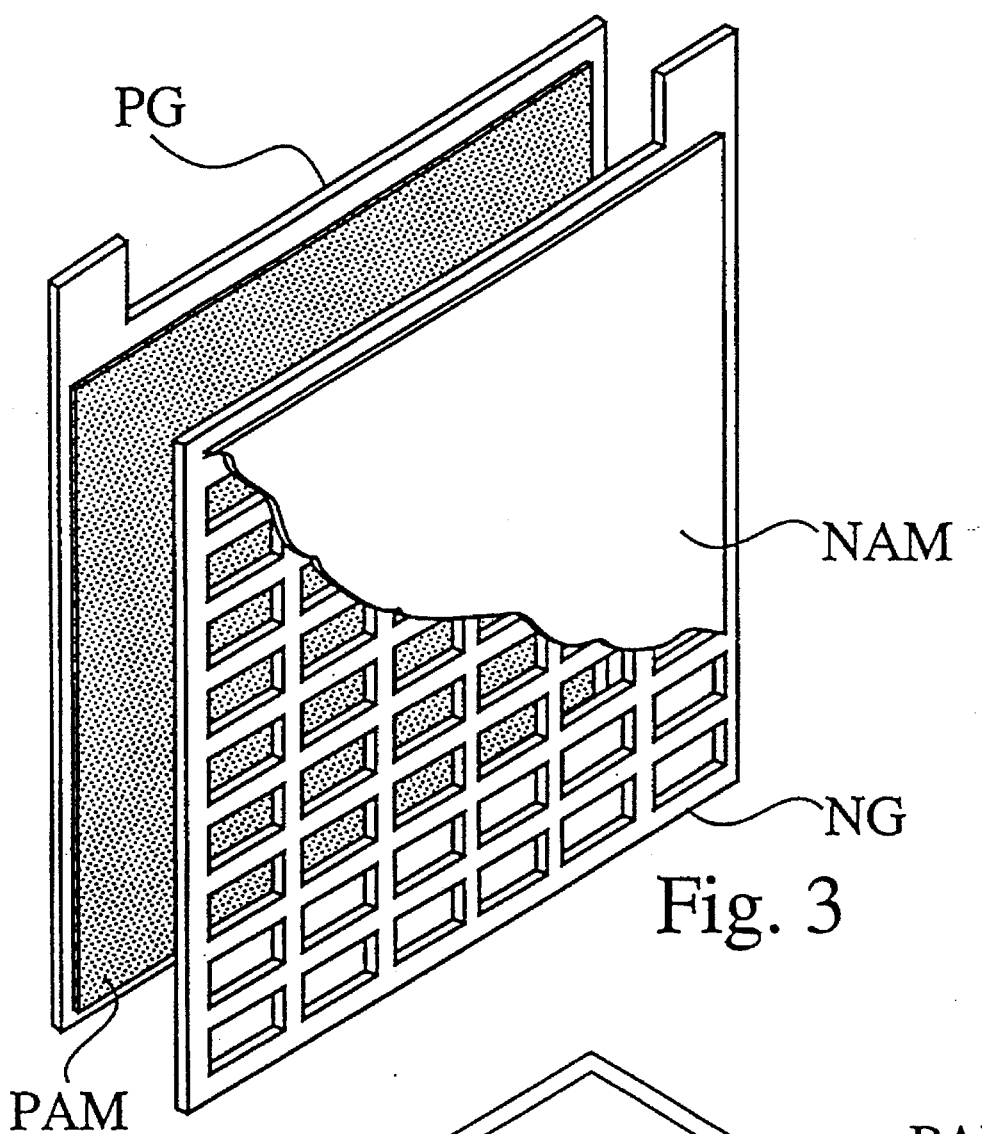
Figure 4:
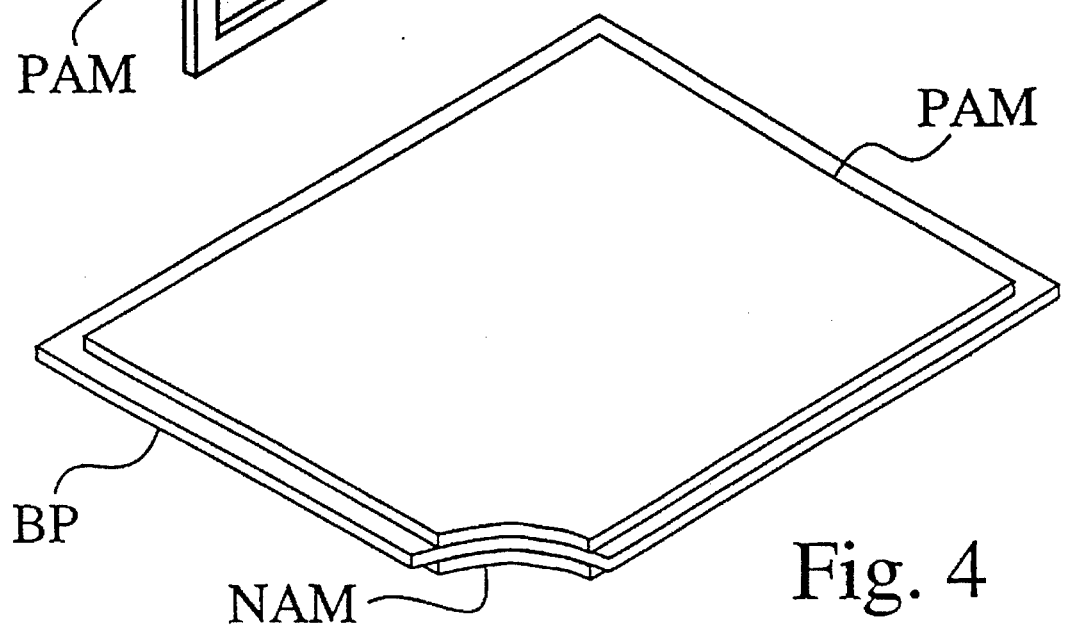
Figure 5:
Figure 6:
Figure 7:
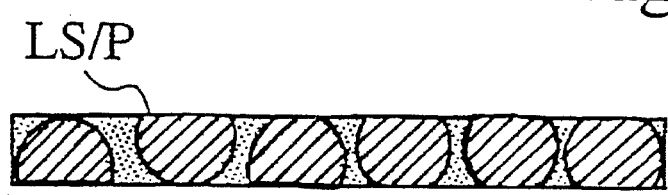
Figure 8:
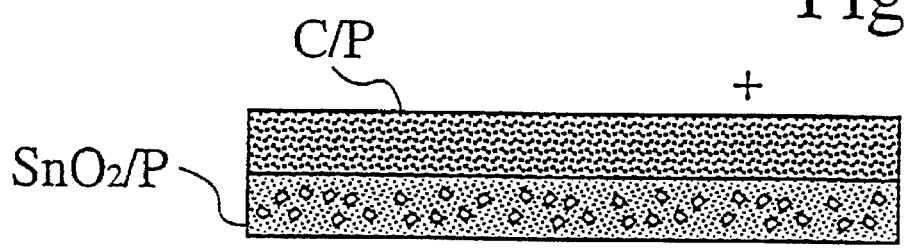
Figure 9:
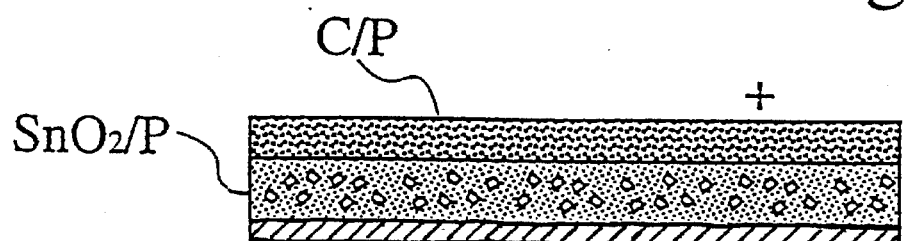
Figure 10:
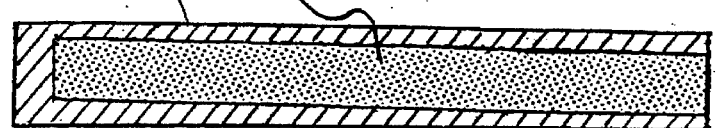

FIGS. 3 and 4 compare the structures of grids and bipolar plates.

FIGS. 5, 6, 7, 8, 9 and 10 present a series of six illustrations of previous approaches to the construction of bipolar battery plates. None of the dimensions presented in FIGS. 5 through 10 are shown to scale.

Figure 11:
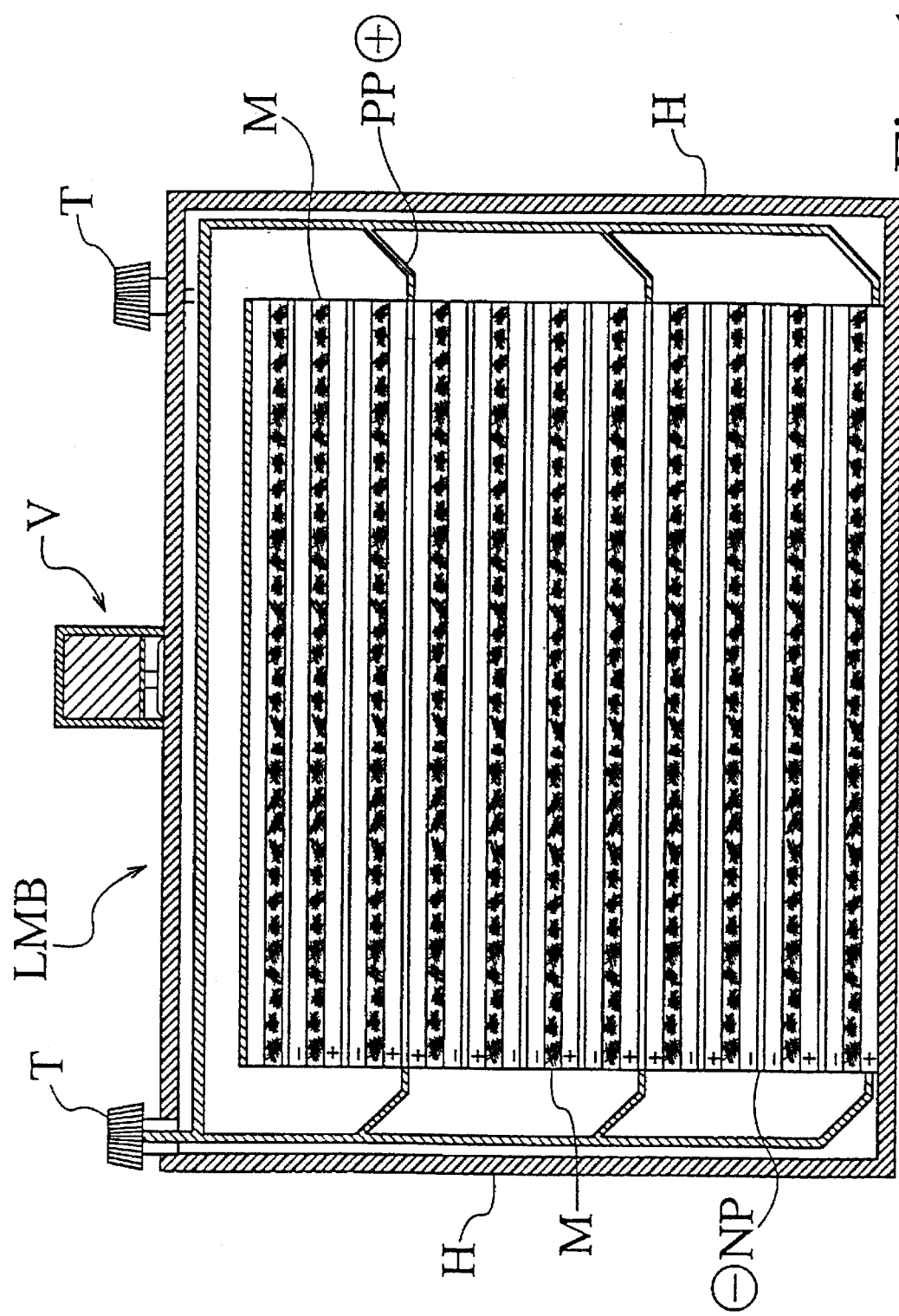

FIG. 11 is an illustration of a *Sealed Bipolar Multi-Cell Battery*, which is described in my U.S. Pat. No. 4,539,268.

Figure 12:
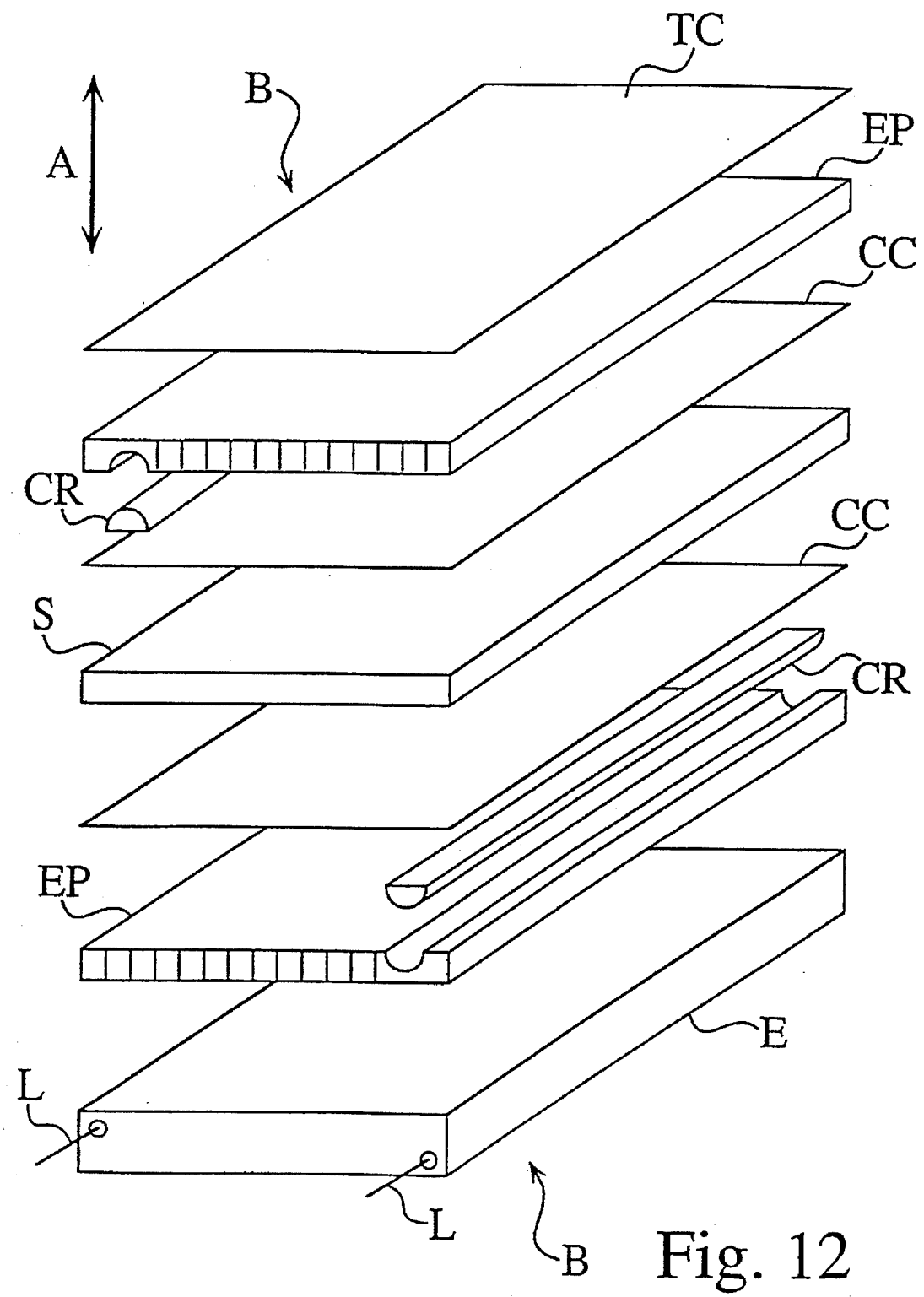

FIG. 12 provides an illustration of the stack configuration of the *Lightweight Bipolar Storage Battery* as disclosed in one of my previous patent applications.

Figure 13:
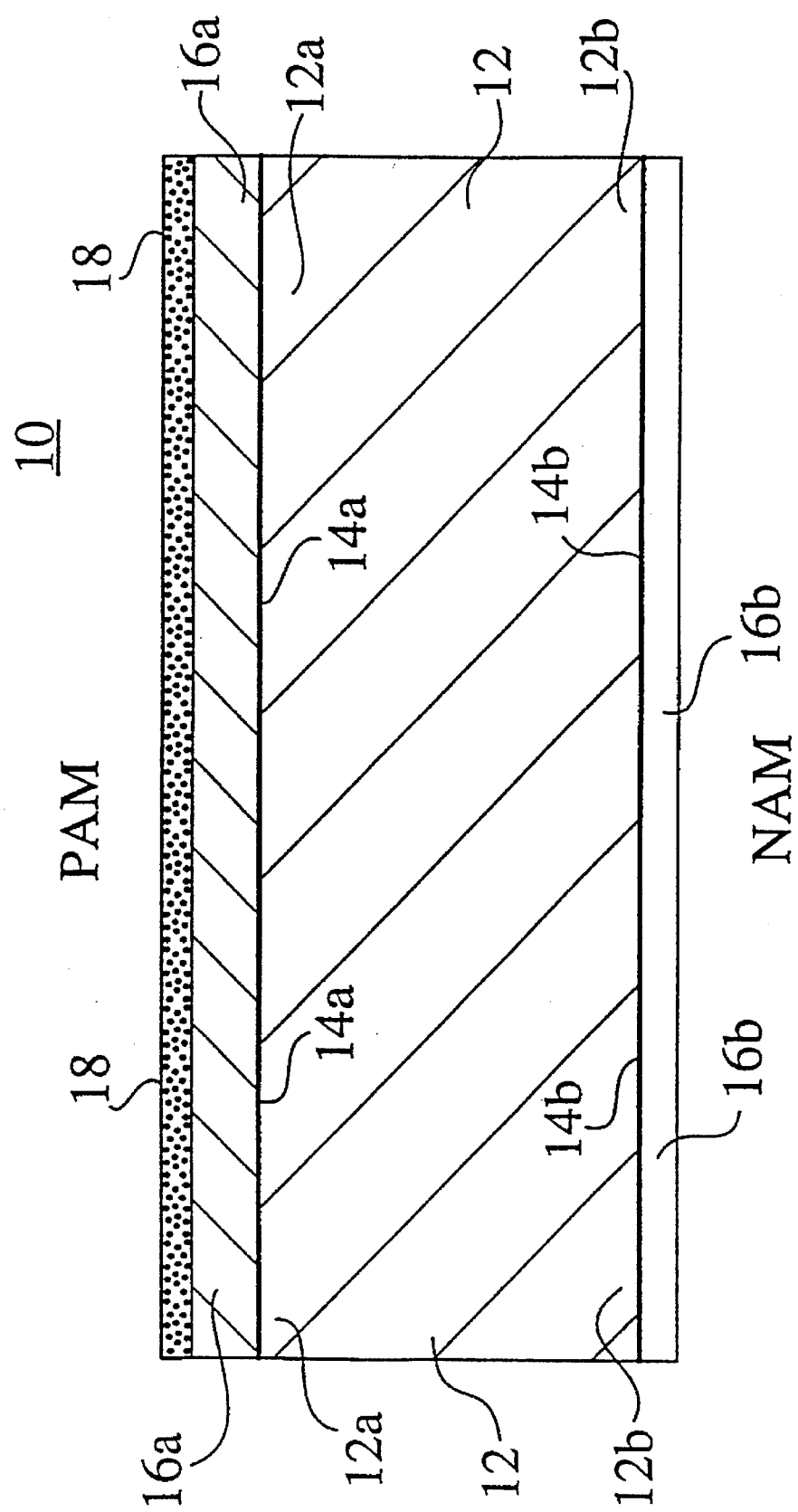

FIG. 13 exhibits one of the preferred embodiments of the present invention.

Figure 16:
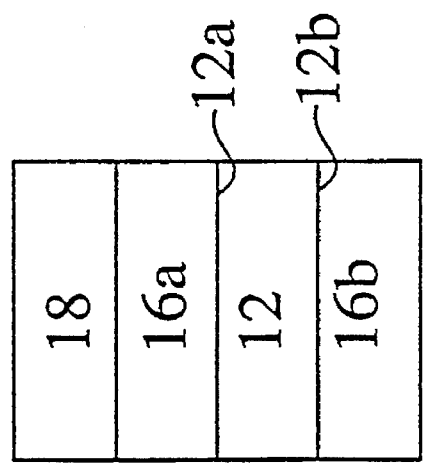
Figure 15:
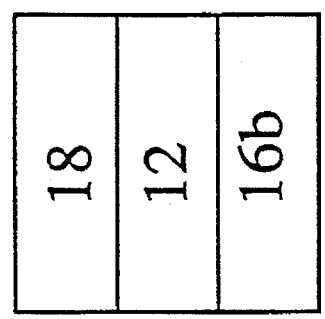
Figure 14:
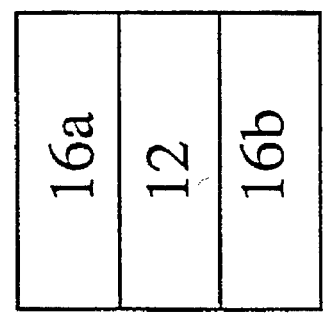

FIGS. 14, 15 and 16 depict some of the basic alternative embodiments of the invention.

FIGS. 17, 18 and 19 depict some of the basic alternative embodiments of the invention that also include additional optional features.

Figure 20:
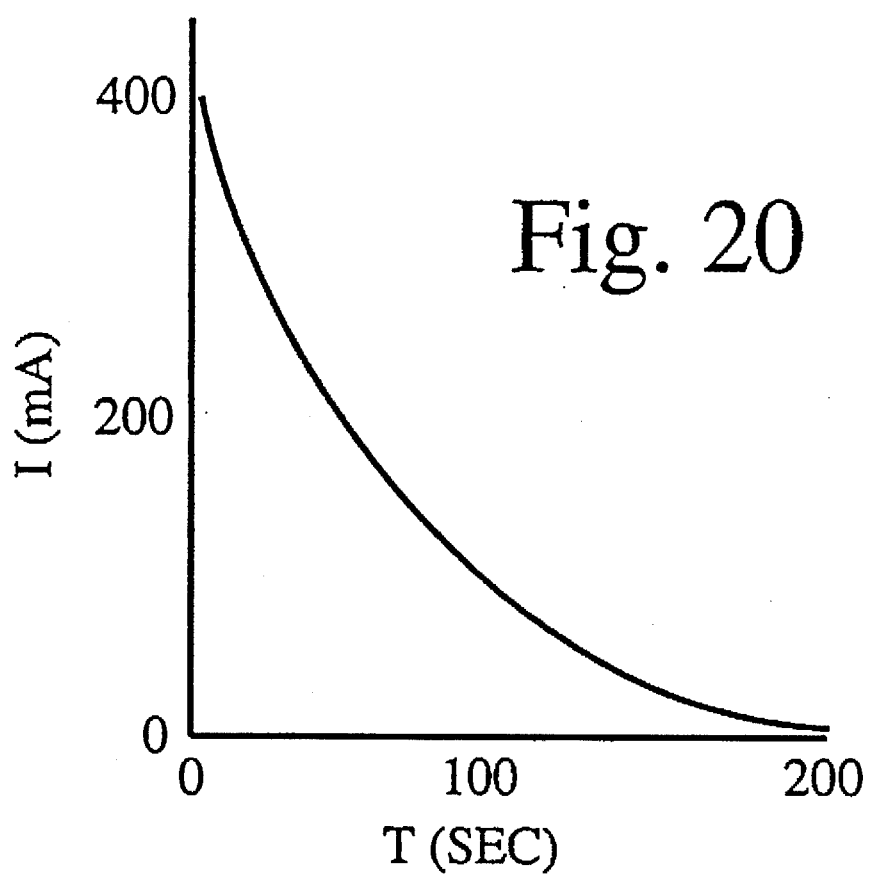

FIG. 20 is a graph of current versus time which exhibits the passivation effects on iron exposed to sulfuric acid.

Figure 21:
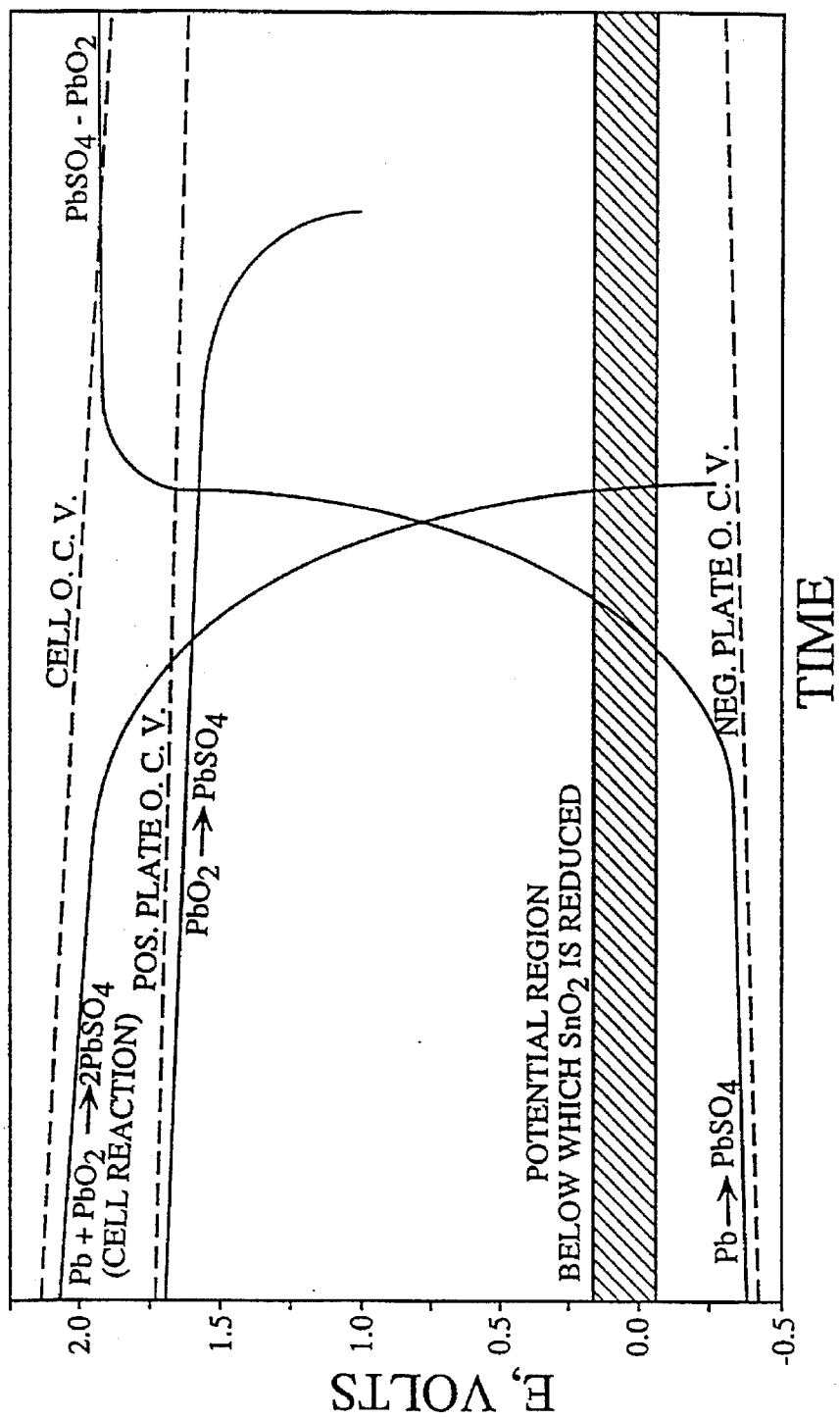

FIG. 21 furnishes a set of graphs of voltage versus time showing various chemical reactions in the battery environment.

Figure 22:
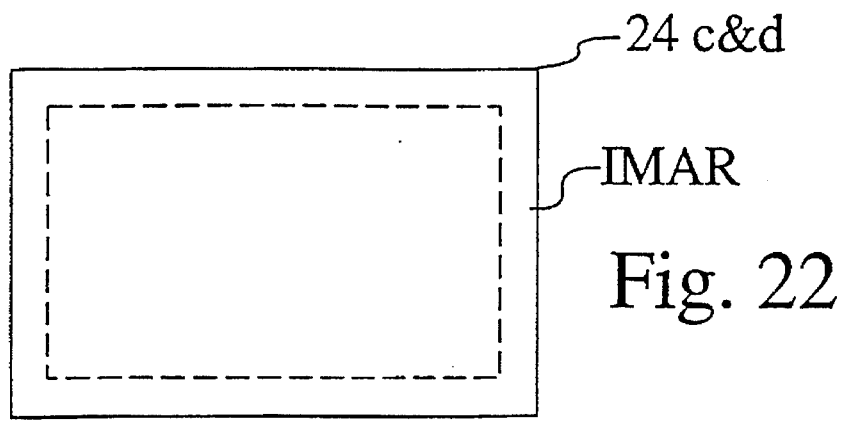
Figure 23:
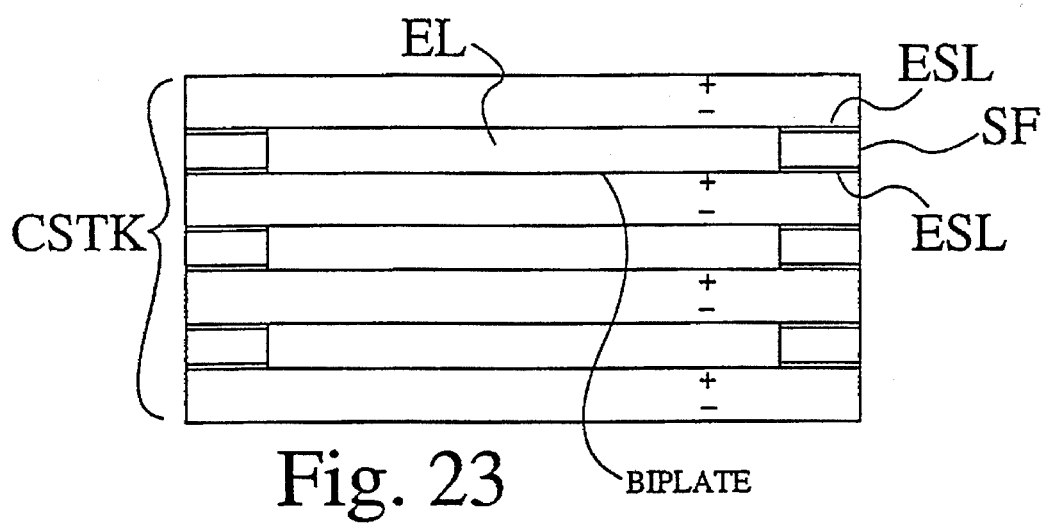
Figure 24:
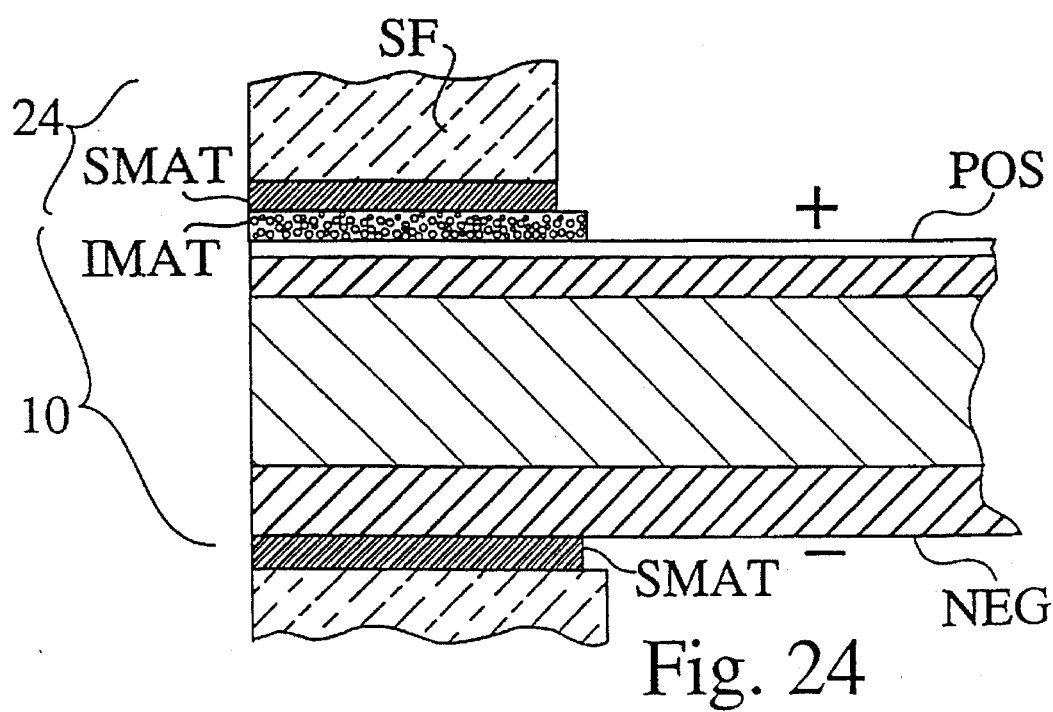

FIGS. 22, 23, and 24 illustrate an insulating margin for edge seal bond protection.

A DETAILED DESCRIPTION OF PREFERRED & ALTERNATIVE EMBODIMENTS

FIGS. 1 through 12 are discussed above in the section entitled *Background of the Invention*. The figures described in this specification are generally schematic and do not necessarily portray the embodiments of the invention in proper proportion or scale.

FIG. 13 supplies a cross-sectional view of the one of the preferred embodiments of the present invention. The novel bipolar plate 10 includes a substrate 12 having an upper surface 12a and a lower surface 12b. The upper and lower surfaces 12a and 12b are also referred to as positive and negative major faces. Two extremely thin layers of wetting material 14a and 14b such as nickel or copper may be applied on each side of the substrate 12. An upper and a lower layer of lead 16a and 16b are securely deposited over the coatings 14a and 14b. The upper layer of lead 16a is protected by a layer of doped stannic oxide 18. A positive active material paste (PAM) is applied over the stannic oxide layer 18. Similarly, a negative active material (NAM) is applied over the lower lead layer 16b. A sulfuric acid electrolyte EL surrounds the internal structures of the battery, but is not shown in FIG. 13. In this specification, the terms "upper" and "lower" are used only to describe relative locations in the drawings and are not intended to delineate or limit the orientation of any element of the invention.

FIGS. 14, 15, 16, 17, 18 and 19 depict various embodiments of the invention. FIG. 14 depicts embodiment 10A, which comprises a central core 12 and two layers of lead 16a and 16b. Embodiment 10B, which is shown in FIG. 15, comprises a central core 12, a negative side layer of lead 16b, and a positive side layer of doped stannic oxide 18. FIG. 16 illustrates embodiment 10C, which comprises a central core 12, a negative side layer of lead 16b, a positive side layer of lead 16a, and a protective layer of doped stannic oxide 18. FIGS. 17, 18 and 19 reveal embodiments 10A, 10B and 10C with flash layers 14a and 14b, as well as seal layers 24. Seal layers 24 include a spacer frame SF, a sealant material SMAT and an insulating material IMAT. These seal layers are best viewed in FIGS. 22, 23 and 24. The reference characters "a", "b", "c" and "d" are used in FIGS. 17, 18 and 19 as suffixes to indicate the relative directions upper, lower, left and right.

In one of the preferred embodiments, the material selected for the central planar substrate or core 12 is pure iron. The primary function of this core 12 is to provide stiffness, electrical conductivity, and mechanical support for the core 12. Pure iron is widely available, relatively inexpensive, and possesses the critical self-passivating characteristics which enable the core 12 to heal its own defects in a high potential and acidic environment. During the passivation process, initially some of the surface of the iron 12 dissolves, then a monolayer of oxide forms which is extremely stable and which precludes further corrosion. The thickness of the iron substrate is envisioned as being generally from 0.005 to 0.010 inches. Although iron is the preferred substance for the central core 12, various steel alloys may also be employed, but in situations in which battery life is of less importance. Steel may be especially useful in situations where heat treating might be utilized to fashion very stiff cores 12.

In one of the embodiments of the invention, the material for the optional wetting agent coatings 14a and 14b is nickel. Although many other wetting agents could provide the characteristic that is required to mate layers of iron and lead, nickel appears to be an attractive candidate for one of the preferred embodiments of the invention. The wetting agent coating 14a & 14b is generally only about one to twenty micro inches thick. The lead layers 16a and 16b serve as the primary protection of the core 12 from electrochemical reaction with the sulfuric acid (not shown) which is on either side of the plates in the battery. In one of the preferred embodiments, layer 16a is about twice as thick as the second lead layer 16b. The upper layer 16a is envisioned as being about 0.0010 inches, while the lower layer 16b is about 0.0005 inches thick. The lead on the positive side 16a serves to protect the iron in the event that prolonged cell reversal destroys the stannic oxide film 18. Iron is normally passivated and would need no protection, but, under abusive conditions, the potential would go through a range in which the iron could lose its passivation. The iron would repassivate during the next recharge, but damage could result in the meantime. The lead on the negative side 16b is the best possible interface for the negative electrode. This interface has an exceptionally high hydrogen over-voltages, and since the active material is also lead, a very strong, low resistance bond is formed.

In one of the embodiments of the invention, the upper or positive layer of lead 16a is covered by a protective coating 18 of conductive, fluorine-doped stannic oxide. Even though the positive layer of lead 16a experiences a relatively low corrosion rate, the stannic oxide covering 18, which is thermodynamically stable and which does not corrode, provides an additional measure of durability and eliminates the high resistance interface from lead corrosion. Although a layer of lead 16a is not strictly necessary to protect the positive side of the substrate 12a, and because of the possibility of abusive battery discharge conditions, a coating of lead on the positive side of core 12 may be optimal for the most durable construction of the core 12. In large part, the integrity provided by the semiconductor material covering 18 permits the use of virtually any thin substrate material 12. In the alternative, other materials besides stannic oxide may be used, including non-stoichiometric titanium oxide.

The present invention provides a practical, lightweight, and low cost bipolar plate 10 for bipolar lead-acid batteries by use of a composite construction. The novel design features include:

(1) a central planar substrate or central plate 12 which has the necessary structural support and electrical conductivity;

(2) an electrically-conducting protective coating 16a on the positive side of the core 12 which is resistant to the positive potential (oxidizing) electrochemical environment; and (3) an electrically conducting protective coating 18 on the negative side of the core 12 which is resistant to the negative potential (reducing) electrochemical environment.

The center core 12 material should be adequately stiff for easy manufacture. This property may be characteristic of the material itself or may be achieved by the addition of stiffening ribs within the material cross section of externally attached plastic ribs. The central core 12 must also possess an electrical conductivity of at least 1.0 ohm$^{-1}$cm$^{-1}$. Many common materials meet these requirements and include common steel and aluminum. A thickness of 0.005 to 0.010 inch thick is envisioned to be the most practical, but the thickness could vary from 0.001 to 0.100 inch. The center core 12 material can be any metal, conductive plastic, or composite material having the characteristics described above, but a special and most desirable class of materials will be those which demonstrate an additional important characteristic: self-healing when exposed to the acid electrolyte and potential. This is important for economical manufacturing and application to prevent any slight imperfection in the protective coating 16a & 16b (e.g., a pinhole or a scratch) from resulting in the corrosion and perforation of the biplate 10 and thus failure of the battery. Immediate corrosion and perforation would occur for most common metals such as steel or aluminum if there were a pinhole imperfection in the protective coating material. A "self-healing" material is one which forms a stable protective film if a defect or scratch in the coating exposes the material inside the coating to the electrochemical environment. The most notable and preferred of these is pure iron or very low carbon content steel (decarburized steel) and one of the preferred embodiments is decarburized steel with a carbon content of 0.003%. This material is readily available and relatively inexpensive. Other materials possessing some degree of "self-healing" ability include titanium and some aluminum alloys, but are not as robust or as inexpensive as iron. Iron and steel are normally considered by the battery industry to be unsuitable for use in lead-acid batteries because ferrous materials promote self-discharge of the battery. This is the result of a ferric/ferrous couple which provides a "shuttle" mechanism. Ferric ion (Fe$^{+3}$) oxidizes the active lead at the negative electrode and is reduced to ferrous ion (Fe$^{++}$). The Fe$^{++}$ then migrates to the positive electrode where it reduces the PbO$_2$ and is re-oxidized to Fe$^{+3}$, and the process repeats. The net result is the self-discharge of the battery. Trace amounts of ferric/ferrous ions, however, can be tolerated in the electrolyte solution without noticeable effects on battery performance or self-discharge. Although it is universally recognized that iron corrodes rapidly when exposed to sulfuric acid and therefore unsuitable for lead-acid batteries, it has not been generally recognized that when a positive potential is applied to the iron greater than about +1.0V above H$_2$/H$^+$, the iron forms a passivating film of iron oxide which protects the iron from further corrosion. This "self-healing" effect in a lead-acid battery environment thus makes this material particularly useful as a center core 12 in bipolar batteries, since it is significantly lighter, stronger, and less expensive than lead.

This "self healing" passivation effect can be seen in FIG. 20, which shows the corrosion current (in milliamps) on exposed iron falling to substantially zero within 3 or 4 minutes after emersion in 30% sulfuric acid with a potential of 1.75V (above hydrogen) applied for 0.6 cm$^2$ of exposed surface area of pure iron plate. After exposure to this environment a very impervious Fe$_3$O$_4$ film is formed which is highly insoluble and non-oxidizable. The iron oxide, which is ordinarily an insulator, remains conductive because of the very low thickness, which has been shown to be only one monolayer. Electron flow by tunneling (a process by which electrons can "jump" across a short gap) can therefore occur. The use of iron as the central core 12 material is thus ideal because of its "self-healing" properties which have been heretofore unrecognized and unused in the battery art. The protective coating on the negative side 16b of the central core 12 can be of any material that does not add significantly to the total weight of the final biplate 10 and that can withstand sulfuric acid in the electrical potential (−0.3 to −0.4V versus H$_2$) present on the negative side of the core 12. This protective coating 16b must also have a high hydrogen over-voltage so as to prevent gassing. The coating 16b must also have a sufficient electrical conductivity (at least 100 ohm$^{-1}$cm$^{-1}$) and must be capable of being applied to the center core 12 material, either alone, or in conjunction with, an intermediate ultra-thin layer of material 14a & 14b. The simplest, cheapest, and most effective protective material is a layer of lead. The lead can be applied by a variety of methods including hot-dipping and electroplating, as is commonly done on metals, or also by vapor deposition which is done on materials which cannot be readily electroplated. In the case of lead plated on an iron central core 12, an ultra-thin "flash" coating (5 to 50 micro-inches thick) of another metal (e.g., nickel or copper) can be applied prior to the lead plating to aid in adhesion. Because lead is thermodynamically stable on the negative side of the core 12, it does not corrode and therefore the coating can be quite thin, 0.0005 inches being more than adequate. Many other metals and graphite could be used to coat the negative side of the core 12 but lead is to be preferred because of its very high hydrogen over-voltage and also because of the tight mechanical and electrical interface which is formed with the negative active material, which is also lead, but in a sponge form.

The protective layer 18 on the positive side of the central core 12 can be of any material which does not add significantly to the weight of the central core 12 and which has reasonable corrosion resistance to the acid environment and electrical-potential (above 1.0V) on the positive side of the core 12. The protective layer 18 must also have sufficient electrical conductivity (at least 0.01 ohm$^{-1}$ cm$^{-1}$), and be capable of being applied to the central core 12, either alone or in conjunction with an intermediate layer. The protective coating on the positive side of the core 12 should either be thermodynamically stable or else degrade very slowly so as to yield a useful battery life. The environment on the positive side of the core 12 is highly destructive to most materials because of the highly corrosive and highly oxidizing conditions present simultaneously. No known elements, including gold, are thermodynamically stable. Even many semiconducting metal oxide materials are not thermodynamically stable (e.g., as $Ti_4O_7$), although they degrade slowly enough to be useful. The preferred coating material for the positive side is conductive stannic oxide ($SnO_2$). The stannic oxide is doped with 0.5 to 5% fluorine to provide adequate electrical conductivity, and is known to persons ordinarily skilled in the art. Doped stannic oxide is thermodynamically stable in the battery environment as shown in FIG. 21, and as shown in my U.S. Pat. No. 4,507,372 wherein the material is used successfully within the positive active material itself. Dopants other than fluorine have been used to dope stannic oxide in the past, most notably antimony, but have been found to be unsuitable because of chemical instability. Fluorine, however, has been found to be stable and was employed successfully as the dopant for the $SnO_2$ coated glass fiber described in my U.S. Pat. No. 4,507,372. Stannic oxide is an ideal material for positive side coating because lead ions (from the lead-dioxide) have been shown to penetrate about 20 Angstroms into the $SnO_2$ surface, thus creating an ideal low-resistance interface. An intermediate layer can be added between the protective coating on the positive side and the center core 12 to aid the adhesion of the protective coating to the central core 12, and/or to provide an additional protective coating in the event that a cell reversal occurs. In a cell reversal, which can result from abusive battery discharge conditions, the 1.75V positive potential can change to −0.3V negative for a period of time, as indicated in FIG. 21. Although $SnO_2$ is thermodynamically stable at positive potentials it will be chemically reduced during cell reversal and thus destroyed. Although this process requires several hours of abusive conditions, the insertion of an additional protective layer between the $SnO_2$ and core 12 would prevent an initial attack on the central core 12 should this occur. This intermediate material can be any material which offers a measure of protection in both positive and negative potentials, is conductive, and adheres to both the core and coating. One of the preferred embodiments of the invention employs lead. Lead is particularly desirable for the intermediate layer because it is also the ideal material for the protective coating on the negative side of the biplate, and thus could be applied to both sides by the same process (e.g., electroplating or hot dipping) and in a single manufacturing step. The thickness of the intermediate lead coating is envisioned as being in the range of 0.001 to 0.002 inches thick for the best combination of performance and weight. The stannic oxide coatings can be applied by a variety of methods. For biplate designs incorporating an intermediate layer of lead between the center core 12 and stannic oxide coating, physical vapor deposition, sputterings, or arc flame spraying are possible. For biplates which do not have a lead intermediate layer, the stannic oxide 18 can also be applied by dispersion coating or electrophoresis followed by firing in an oxygen free oven. The stannic oxide can also be deposited on the center core 12 by chemical vapor deposition if the center core 12 is protected from rapid oxidation by either a protective intermediate layer (e.g., a very thin flash of silver) or by an inert gas reaction.

Mixed Acid Electrolyte

The passivating characteristic of iron core 12 can be improved further by adding phosphoric acid ($H_3PO_4$) or boric acid ($H_3BO_3$) as an electrolyte additive to the sulfuric acid electrolyte EL which is employed with the biplate 10. The effect becomes very strong when each of these acids are used at about 2% by weight in the sulfuric acid electrolyte. The preferred range by weight of the added phosphoric or boric acid is from approximately one to ten percent.

Edge Seals

An important further refinement of the protective coating 18 or 16a on the positive side of the biplate is to provide an additional margin of non-conductive material around the edge of the battery 10 wherever the layers 16a or 18a would be in contact with the cell edge seal material. These features are illustrated in FIGS. 22, 23, and 24. FIG. 22 is a top view of a cell stack CSTK showing an insulating margin IMAR. The side view of the same cell stack CSTK depicted in FIG. 23 exhibits biplates separated by spacer frames SF and edge seals ESL. FIG. 24 reveals the details of the insulating material IMAT, sealant material SMAT and spacer frames SF surrounding a biplate. Maintaining a leak-proof edge seal ESL is critical to obtaining a long battery life because leakage of electrolyte EL will eventually result in shorts between the cells. Without an insulating margin IMAR, the edge seal material ESL will be exposed to both the corrosive sulfuric-acid electrolyte and, wherever the seal ESL directly contacts the conductive protective layer 16a or 18a on the positive side of core 12, will simultaneously be exposed to the oxidizing voltage potential. Just as no metallic elements and few metallic oxides can withstand this environment for long, there are also very few seal materials which are resistant to this environment. Notable exceptions are teflon and other fluorocarbons, which unfortunately, are also difficult to bond. Common seal materials such as epoxies, urethanes, and elastomers are not thermodynamically stable and, where exposed to this environment, will all eventually oxidize, degrade, and leak. By applying an insulating margin IMAR around the edge of the core 12, these common seal materials can be used successfully because they no longer are exposed to the destructive oxidizing electrical potential, and need only to tolerate the long-term exposure to the acid electrolyte environment. Thus, an alternative embodiment of the invention utilizes a material used in the margin around the edge of the biplate 10. The material is an insulator (conductivity less than 10$^{-7}$ ohm$^{-1}$ cm$^{-1}$), which resists both the sulfuric acid electrolyte and the negative 1.75 volt oxidizing potential, and which is capable of being applied in a thin layer around the edge of the biplate wherever the biplate is in contact with the edge seal material. In general, it is envisioned that these insulating materials will be ceramics (i.e., non-conductive metal oxides) including but not limited to (undoped) stannic oxide or aluminum oxide. The application methods can be by vapor deposition (e.g., for stannic oxide), plasma spraying, or porcelainizing (as is commonly done on steel in the manufacture of household appliances). The thickness of the insulating material can be very thin (one micron) for vapor deposited coatings, to very thick (e.g., 0.030 inch) for fired porcelain edges.

In one of the preferred embodiments, the edge seal material ESL would be undoped stannic oxide vapor deposited within the same equipment as used to apply the doped stannic oxide coating to the center core 12. To deposit the undoped material on only a narrow margin (e.g., ¼ to ½ inch) around the core 12 edge, the center of the core 12 is masked during the final deposition step of the insulating material. The embodiment is shown schematically in FIG. 22. In the case where porcelain is applied to the core 12 edges, application can also be confined to the edges by either masking or edge dipping prior to firing. Whichever method is used to achieve the insulating margin IMAR, and whatever the design of the accompanying edge seal (i.e., a discrete seal bonded between biplates using epoxy or "caulking" between the plates with an elastomeric sealant) the objective remains the same: insulate the edge sealant material from the destructive oxidizing potential present on the positive side of the hiplate and thus extend the useful life of the seal and thus of the battery.

Specific Applications of the Invention

Although a number of different biplate coating materials and ranges of thickness have been described, it should be recognized that the optimum biplate design will depend on the battery application. In some applications, such as electric automobiles, power and weight are more important than, for example, in utility-company electrical energy storage where life and cost may be the paramount considerations. For applications like emergency power storage, where the battery will not be cycled extensively and be on "float" charge, the stannic oxide coating can be omitted and the positive and negative side protective coatings can both be plain lead. The optimum combination of materials, coatings, and thickness must thus be selected for each application. The construction of the biplate described in the present application is also applicable to the construction of each of the two end-plates in the stack of cells in a bipolar battery. The construction methods can also be applied to the final plate at each end of the stack of cells, which will be either positive or negative. The end-plate-and-current-collector design is described in detail in my U.S. patent application Ser. No. 07/516,439 filed on 30 Apr. 1990.

The current embodiment of a bipolar plate design based upon the present invention and as currently envisioned for electric automobiles is as follows: a center core 12 of iron 0.005-inch thick, coated on the negative side with 0.0005-inch thick pure lead electroplated onto the iron core 12 by the aid of a 20 microinch flash of nickel between the lead and iron, and coated on the positive side with a protective coat of fluoride-doped stannic oxide 2 microns thick. In addition, a final non-conductive (undoped) layer of stannic oxide is applied on the positive side in a 0.5 inch-wide strip around the edge of the biplate to form an insulating margin for the battery-cell edge seal area. The advantages of this embodiment over the past approaches to constructing a bipolar plate, in terms of weight, conductivity, and cost, can be seen in Table 1.

TABLE 1

Comparison of the Present Invention and Previous Bipolar Plates in a 48-Volt 50 Amp-hour example battery

| Figure Number | Plate Construction | Approx. plate thickness (mm) | Total Weight of plates in 48V battery (kg) | Approx. area-resistance of plate (ohms/cm$^2$) | Approx cost of plate mat'ls. ($) |
|---|---|---|---|---|---|
| 5 | Pure lead sheet | 0.41 | 16.8 | <10$^{-6}$ | 15 |
| 7 | Plastic sheet embedded lead spheres | 1.0 | 5.0 | <10$^{-5}$ | 10 |
| 9 | Carbon, SnO$_2$ fibers plastic composite, lead | 1.0 | 11.7 | 0.1 | >170 |
| 13 | Present invention: SnO$_2$, iron, Pb composite | 0.18 | 4.0 | 10$^{-7}$ | 10 |

Secure Bonds between Layers of the Biplate

In each of the embodiments disclosed above, all the layers including the core, the intermediate layers, and the negative and positive side protective layers are bonded together to form secure joints or unions between dissimilar materials. The implementation of the present invention may require the use of various chemical, mechanical or metallurgical techniques including, but not limited to, deposition, sputtering, spraying, plating, electroplating, hot-dipping, rolling, compression bonding, adhesive bonding or cladding. These fusing methods are employed to create substantially permanent connections between different surfaces.

These methods are quite different from the far less stable and loose coverings or coatings of paste or sponge active materials that are applied over or within bipolar plates. Some earlier inventions may use metal, plastic, fiberglass or composite cores with active materials applied over both sides of the core, but these active materials are not rigidly or tightly affixed to the core. Over time, these paste or sponge active materials may flake or fall off the biplates. In sharp contrast, the preferred embodiment of the present invention comprises an integral biplate having a core with two protective layers that are firmly secured to the core or to intermediate layers that are also firmly secured to the core.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various material choices and dimensions that have been disclosed above are intended to educate the reader about one preferred and three alternative embodiments, and are not intended to constrain the limits of the invention or the scope of the claims. The *List of Reference Characters* which follows is intended to provide the reader with a convenient means of identifying elements of the invention in the specification and drawings. This list is not intended to delineate or narrow the scope of the claims.

LIST OF REFERENCE CHARACTERS

FIGS. 1, 2, 3 & 4

| | |
|---|---|
| BP | Biplate |
| CS | Case |
| EL | Electrolyte |
| EP | Endplate |
| ESA | Edge seal area |
| GCS | Grid cross-section |
| NAM | Negative active material |
| NG | Negative grid |
| PAM | Positive active material |
| PAR | Partition |
| PG | Positive grid |
| SEP | Separator |
| T | Terminal |

FIGS. 5, 6, 7, 8, 9 & 10

| | |
|---|---|
| C/P | Carbon-in-plastic |
| LS/P | Lead spheres in plastic |
| P | Plastic |
| Pb | Lead |
| $SnO_2$/P | Doped stannic oxide in plastic |

FIG. 11

| | |
|---|---|
| LMB | Low maintenance battery |
| H | Housing |
| M | Fiberglass mats |
| NP | Negative plates |
| PP | Positive plates |
| T | Teminals |
| V | Resealable vent |

FIG. 12

| | |
|---|---|
| B | Bipolar plate battery |
| CC | Current collector plate |
| CR | Current removing element |
| E | Enclosure |
| EP | End plate |
| L | Leads |
| S | Central stack |
| TC | Top cover |

FIGS. 13, 14, 15, 16, 17, 18 & 19

| | |
|---|---|
| 10 | Bipolar plate |
| 10A | Alternative embodiment |
| 10B | Alternative embodiment |
| 10C | Alternative embodiment |
| 12 | Substrate or Core |
| 12a | Upper surface of core |
| 12b | Lower surface of core |
| 14a | Upper intermediate layer |
| 14b | Lower intermediate layer |
| 16a | Upper layer of lead |
| 16b | Lower layer of lead |
| 18 | Layer of doped stannic oxide |
| 24 | Spacer frame, sealant material & insulating material |

FIGS. 22, 23 & 24

| | |
|---|---|
| CSTK | Cell stack |
| EL | Electrolyte |
| ESL | Edge seal |
| IMAR | Insulating margin |
| IMAT | Insulating material |
| SF | Spacer frame |
| SMAT | Seal material |

What is claimed is:

1. A lead-acid battery, comprising:

a central core element, formed of a material including iron or steel; and protection layers, covering said central core element;

said central core element and protection layers being maintained in an acid environment.

2. A battery as in claim 1 wherein one of said protection layers is on a positive side of the core element, said one protection layer including fissures therein.

3. A battery as in claim 2 wherein said one protection layer is formed of $SnO_2$.

4. A battery as in claim 1 wherein said one protection layer is formed of $SnO_2$.

5. An acid environment battery system, comprising:

a container including an acid environment therein;

an active battery element formed in said acid environment, said active battery element formed of a material including iron or steel which supports production of an electrical potential;

a positive side protection element, covering a positive side of said active battery element, said positive side protection element including a path which allows acid from said acid environment to pass through said protection element to said active element; and a negative side protection element, protecting said active element against the acid environment.

6. Apparatus as in claim 5 wherein said path is formed from fissures in the positive side protection element.

7. Apparatus as in claim 6 wherein the positive side material is $SnO_2$.

8. Apparatus as in claim 5 wherein said active element is iron or steel.

9. A method of forming a battery in an acidic environment, comprising:

forming a core with a material including iron or steel;

covering said core to protect said core from said acidic environment, the covering including a path for the acid to reach said core of said material; and exposing said core of said material to a potential in said acidic environment to form a passivating film of said material thereon.

10. A method as in claim 9 wherein said covering includes $SnO_2$.

11. A method as in claim 10 wherein said path includes fissures in the $SnO_2$.

12. A method as in claim 11 wherein said exposing includes exposing said system to a 30 percent sulfuric acid solution at a potential of 1.75 volts above hydrogen for each 0.6 square centimeter of exposed surface area of iron plate.

13. A method of forming a lead acid battery, comprising:

forming a core of an iron-like material;

exposing the iron material to an acidic environment under voltage to form an iron oxide material thereof of an effective thickness to remain conductive but sufficient thickness to enable protection against the acid environment.

14. A method as in claim 13 wherein said iron oxide is formed of one molecular monolayer.

15. A battery comprising:

a housing including an acidic environment therein; and an active material in said container, said active material having a capability of self-healing, and formed of a material including iron or steel, said active material of iron or steel being effective to self-heal in said acid environment.

* * * * *